Patented Jan. 4, 1949

2,458,408

UNITED STATES PATENT OFFICE 2,458,408

ACROLEIN-PHENOL RESIN

Grafton R. Owens, Dayton, Ohio, assignor to Monsanto Chemical Company, St. Louis, Mo., a corporation of Delaware No Drawing. Application August 17, 1945, Serial No. 611,245

7 Claims. (Cl. 260—53)

This invention relates to new synthetic resin compositions, more particularly to synthetic resins prepared by reaction of phenol with acrolein, and to a process for producing the same.

In the prior art, processes have been described for the production of resinous products from acrolein and phenol, but such processes do not lend themselves to the commercial production of easily worked resinous products. Thus, in U. S. Patent No. 1,607,293 to Moureu and Dufraisse there is described the condensation of phenol with acrolein in the presence of a basic condensing agent and it is stated that the process is likewise applicable to any other suitable bodies containing a phenolic group such as, for example, cresol or naphthol. However, the condensation of phenol with acrolein in the presence of a basic catalyst leads to the formation of products which lack uniformity, for there occurs not only a reaction of the phenol with the acrolein, but also an alkaline catalyzed auto-condensation of the acrolein. In the presence of a basic condensing agent the tendency of acrolein to condense with itself may be greater than its reactivity for the phenol. Later, in an article by Maksorow et al., which appears on pages 827 to 833 of volume 24 of Industrial and Engineering Chemistry for 1932, there is described for formation of condensation products obtained by reaction of phenol and acrolein in the presence of both acidic and basic condensing agents at 20° C., which temperature is maintained throughout the experiment. These investigators reacted phenol with acrolein in the presence of approximately 0.5% of an acidic or alkaline condensing agent, based on the weight of the phenol employed; but only after from 3 to 42 days were they able to obtain solid products, the course of the reaction being studied merely by the change in the viscosity of the reaction mixture. Obviously, a process requiring so long a time for the prodction of condensation products is unsuitable for commercial application. While Maksorow et al. give but a meager description of the resinous products obtained by them from phenols and acrolein, the products are apparently of little interest for the purposes to which synthetic resins are customarily applied. They are reported to have the pungent odor of acrolein, which characteristic may indicate incomplete reaction of the initial reactants.

In attempting to duplicate the resins made by the method of Maksorow et al., I tested: (1) beta-naphthalene sulfonic acid, (2) phosphoric acid, (3) acid potassium sulfate and (4) boric acid as reaction catalysts. I found that catalyst (1) caused so violent a reaction that the stopper was blown out of the reaction flask, leaving a residue in the flask consisting of a hard, black solid which could not be removed by pouring in the customary manner, and consequently was useless. I concluded that this reaction could not be controlled even on a laboratory scale if the quantity of this catalyst was as large as that stated by Maksorow et al., and that to attempt to carry out the reaction on a commercial scale using several hundred times the quantity of materials employed would be extremely hazardous.

Moreover, in carrying out condensations of phenol and acrolein employing catalysts (2), (3) and (4) above, according to the method of Maksorow et al., I found that boric acid was least effective in catalyzing the condensation, phosphoric acid was somewhat more effective, while acid potassium sulfate was most effective. In this comparison, effectiveness was judged by observing the viscority of the resin during the course of the reaction.

Noting that Maksorow et al., had observed that at the end of 10 days, as judged by the viscosity of the resin solution, acid potassium sulfate was least effective, phosphoric acid was next and boric acid was most effective as a catalyst and that at the end of 38 days the order of effectiveness had become: least, phosphoric acid; next, boric acid; and most, acid potassium sulfate, I concluded that the publication by Maksorow et al. did not disclose a commercial process for producing phenol-acrolein resins.

Now I have found that I can obtain valuable resinous products from phenol and acrolein in good yield if I heat together in the presence of acid catalysts at temperatures ranging upwardly from the boiling point of acrolein at atmospheric pressure (52° C.) to the boiling point (refluxing temperature) of water or water and phenol present during the reaction, which temperaure will be below 105° C., a mixture which has a composition ranging from 0.75 mol to 1 mol of phenol and from 1 to 3 mols of acrolein. The acid catalyst employed should have an activity equivalent to that furnished by from 0.014% to 0.028% of $H_2SO_4$ based on the total weight of phenol and acrolein in the said mixture.

Acid concentrations below the lower limit will ordinarily result in an incomplete or an excessively slow reaction. Likewise, acid concentrations greater than the higher limit result in so greatly accelerated a reaction as to result in a non-homogeneous product which is bady discolored to black. For the purpose of achieving uniformity in a batch of resin it is desirable that the resin batch be maintained at the reaction temperature at least for a relatively short period, that is, generally for about 20 minutes. Hydrolyzable acid salts which yield a metal oxide or hydroxide, insoluble in water, or precipitating upon neutralization, are undesidable.

The present invention is thus based on the discovery that I can prepare valuable resins from phenol and acrolein within a commercially practical length of time by operating at temperatures within the range 52° C. to 105° C. in the presence of a definite quantity of acidic catalyst, the quantity of the acidic catalyst employed being a function of the activity of said catalyst. Thus, for example, I have found that by using proportions of phenol to acrolein within the above limits and at temperatures of from 52° C. to 105° C., I am able to obtain hard, brittle resins by heating the reactants for a time of from 30 minutes to 3 hours in the presence of the indicated amounts of the following catalysts:

| Acid Catalyst | Weight/2 Gram Mols of Phenol | Factor |
| --- | --- | --- |
| | G. | |
| 100% Sulfuric acid | 0.052 | 1 |
| Benzenesulfonic acid | 0.10 | 1.9–2.0 |
| beta-Naphthalenesulfonic acid | 0.12 | 2.3–2.5 |
| Trichloroacetic acid | 0.5 | 9.0–10.0 |
| Hydrochloric acid | 1.19 | 20.0–25.0 |
| Phosphoric acid | 3.50 | 60.0–70.0 |

The factor in the second column of the above table indicates the weights of the respective acid catalysts to be used to obtain substantially the same effect as 100% sulfuric acid.

The above data are given as an indication of the amount of various acid catalysts which may be employed for the production of useful resins from phenol and acrolein. While I prefer to operate at refluxing temperatures and at atmospheric pressure in order to effect complete reaction as rapidly as possible in the presence of the lowest useful amount of catalyst, I may use lower temperatures within the above range when employing sulfuric acid or the sulfonic acids as catalysts, since only a very small amount of the strong catalyst is sufficient to offset the loss in reaction rate which may be expected as a result of the lowering of the reaction temperature. On the other hand, the lower catalytic activity of the other acids necessitates the use of proportionately greater amounts of catalyst with the result that the presence of the catalyst residues in the final product becomes evident, as for example, by the formation of somewhat cloudy products. Hence, in preparing resins where high clarity is desired with catalysts other than sulfuric acid or the sulfonic acids, the use of refluxing temperatures is especially desirable in order to obtain clear, brittle resins within a commercially practical length of time.

Although I am able to obtain useful products from phenol and acrolein in the presence of sulfuric acid or a sulfonic acid when operating over the range of temperatures above disclosed, I prefer to work at refluxing temperatures even in the presence of these catalysts, for I have found that the most valuable products are obtained when the amount of catalyst residues in a phenol-acrolein resin is kept at a minimum. When it is realized that the amount of acidic catalyst employed in the reaction must be subsequently neutralized, the advisability of using the lowest possible amount of catalyst is obvious. Hence, in the production of my phenol-acrolein resins I prefer to employ sulfuric acid as the catalyst and to operate at the refluxing temperature of the reaction mixture. Accordingly, hydrolyzable metal salts such as aluminum chloride or zinc chloride, which may yield metal hydroxides, are to be avoided.

In practice, for the preparation of fusible potentially reactive resins from phenol and acrolein, I prefer to proceed substantially as follows:

To two mols of phenol I add between 0.0458 g. and 0.055 g. of 94% sulfuric acid and heat the phenol-sulfuric acid to approximately the boiling point of phenol (150° C. to 185° C.). I then gradually add over a period of from 15 minutes to one hour the required quantity of acrolein, preferably by passing the vaporized acrolein into the hot phenol-sulfuric acid mixture. When the acrolein is present in the mixture in sufficient quantity to produce a noticeable reaction, the temperature drops sharply to the refluxing temperature of the liberated water (below 105° C.) and condensation with resin formation takes place. After all of the acrolein has been added, the reaction mixture is refluxed for, say, 30 minutes to one hour, after which an acid neutralizing agent such as barium acetate is added in the calculated amount so as to neutralize the sulfuric acid. At this point, further condensation is inhibited and the reaction mixture may be dehydrated, for example, by distillation under vacuum. When completely dehydrated, the resin may be poured from the resin kettle and is sufficiently brittle so that it may easily be ground to a fine powder for incorporation into a molding composition.

In this way, utilizing a phenol-acrolein ratio from 0.75 to 1 or 1.5, I have been able to produce brittle resins, melting at from 76° C. to 80° C. (copper bar), which, when admixed with a hardening agent and the usual fillers form molding compositions that yield molded products of high strength, good finish and low water-absorption. On the other hand, by increasing the amounts of acrolein employed in the reaction, I may obtain oil-soluble resins directly. For example, with a phenol-acrolein molar ratio greater than 1 to 1.5, and extending up to as much as 1 to 3.0, the product becomes rubbery and surprisingly the the resin exhibits oil-solubility. Accordingly, oil-soluble resins valuable for coating purposes may be produced when the phenol-acrolein molar ratios are from 1 of phenol to from 1.5 to 3.0 mols of acrolein.

It will be understood that the range of acid concentrations herein disclosed is based on the employment of pure phenol and pure acrolein. It is, accordingly, necessary that there be present no glycerine, glycerides or polyglycerides. Such bodies have an unpredictable effect upon the reaction so that reproducible products are not obtainable.

Since the amount of acid catalyst utilized is so small the presence in the resin kettle of traces of alkali should be guarded against because a slight change in acid concentration is known to have a pronounced effect on the properties of the resin.

My phenol-acrolein resins continue to advance in the presence of acid catalysts upon continued heating, in a manner similar to a one-stage resin. I have found that this advancement may be interrupted at any desirable stage by reducing the concentration of the catalyst below the critical minimum range. Such an interruption may be effected either by partial or complete neutralization or by substituting a weak acid, for example, acetic acid which is formed by the addition of an equivalent amount of barium acetate. The advancement then stops and the resulting resin is perfectly stable to further heating. It may then be dehydrated, etc., and worked up as a two-stage resin. This resin has the property of being hardenable to an infusible stage by the addition of either acid or alkali in compounding.

The invention is illustrated, but not limited, by the following examples:

Example 1

Into a flask equipped with mechanical stirrer and reflux condenser I place 188 g. (2 mols) of phenol, 0.055 g. (0.03 cc.) of 94% sulfuric acid (equivalent to 0.027% of 100% $H_2SO_4$ based on the weight of the phenol, or 0.017% of 100% $H_2SO_4$ based on the total weight of the phenol and acrolein) and heat the reaction flask on an oil-bath until the temperature of the phenol-sulfuric acid mixture is 176.5° C. Then, during the course of approximately 30 minutes I add, with stirring, 112.1 g. (2 mols, 133.6 cc.) of acrolein through a tube leading below the surface of the phenol. At the end of this time the refluxing temperature of the reaction mixture is 95° C. I continue the refluxing for approximately 20 minutes, add barium acetate in an amount which is equivalent to the sulfuric acid, mix well, and then dehydrate the reaction mixture by distillation under vacuum. In this way I obtain 239.5 g. (90.6% yield) of a hard, light yellow resin which melts at 76° C. and is insoluble in China-wood oil and benzene and slightly soluble in acetone and absolute alcohol.

I next prepare a mixture consisting of 100 parts of the ground resin as produced above, 10 parts of hexamethylene-tetramine, 1.5 parts of calcium hydroxide and 1.0 part of zinc sterate and then prepare a molding composition by compounding 47.5 parts of this mixture with 47.5 parts of wood flour and 5 parts of burnt umber. The resulting composition is incorporated in a ball mill and then rolled for one minute upon heated rolls with roll temperatures for front and back rolls of 210° F. and 290° F., respectively. The rolled resin is then ground and utilized in a hot molding operation. Molded test pieces made therefrom yielded the following results:

Olsen Bakelite flow _____ inches__ 0.84
Cure _____ seconds__ 62
Water absorption, 48 hours_____percent__ 0.83
Finish after water absorption_____ good

Example 2

I proceed as in Example 1, except that here I use 0.046 g. (0.025 cc.) of 94% sulfuric acid (equivalent to 0.023% of 100% $H_2SO_4$ based on the weight of phenol and 0.014% of 100% $H_2SO_4$ based on the total weight of phenol and acrolein). In the neutralizing step I add an equivalent amount of barium acetate. In this manner I obtain 259.2 g. (98.1% yield) of a hard, light yellow resin which melts at 80° C., is insoluble in China-wood oil and benzene and slightly soluble in acetone and absolute ethyl alcohol.

The resin of this example is compounded into a molding composition, incorporated in a ball mill and rolled as in Example 1. Test pieces made therefrom in a hot molding operation yielded the following results:

Olsen Bakelite flow _____ inches__ 0.80
Cure _____ seconds__ 62
Water absorption, 48 hours_____percent__ 0.83
Finish after water absorption_____ good

Example 3

Into a flask equipped with a mechanical stirrer and reflux condenser I place 188 g. (2 mols) of phenol and 0.055 g. (0.03 cc.) of 94% sulfuric acid (equivalent to 0.027% of 100% $H_2SO_4$ based on the weight of the phenol and 0.014% of 100% $H_2SO_4$ based on the total weight of the phenol and the acrolein). I heat the reaction flask on an oil-bath until the temperature of the phenol-sulfuric acid mixture is 177.5° C. Then during the course of 37 minutes I add 168.2 g. (3 mols, 200.3 cc.) of acrolein through a tube leading below the surface of the phenol. At the end of this time the refluxing temperature is 80° C. I continue the refluxing for 1 hour and 13 minutes, neutralize the reaction mixture with an equivalent amount of barium acetate, mix well for approximately ten minutes and then dehydrate the reaction mixture by distillation under vacuum for approximately 20 minutes. In this manner I obtain 300.5 g. (99.3% yield) of a hard, light yellow to orange resin which melts at 80° C. and is insoluble in China-wood oil and benzene, slightly soluble in acetone, and insoluble in absolute ethyl alcohol.

The resin of this example was compounded into a molding composition as in Example 1, incorporated into a ball mill, and then rolled for 2 minutes with roll temperatures for front and back rolls of 210° F. and 290° F., respectively. Molded test pieces made therefrom in a hot molding operation yielded the following results:

Olsen Bakelite flow _____ inches__ 1.10
Cure _____ seconds__ 82
Water absorption, 48 hours_____percent__ 0.85
Finish after water absorption_____ good

Example 4

Into a flask equipped with a mechanical stirrer and reflux condenser I place 188 g. (2 mols) of phenol and 1.0 cc. (1.19 g.) of concentrated hydrochloric acid. I heat the reaction flask on an oil-bath until the temperature of the phenol-hydrochloric acid mixture is 173° C. Then during the course of 30 minutes I add, with stirring, 112.1 g. (2 mols, 133.6 cc.) of acrolein through a tube leading below the surface of the phenol. At the end of this time the refluxing temperature of the reaction mixture is 103° C. I remove the source of heat, allow the reaction mixture to stand for 8 minutes, neutralize the acidity of the reaction mixture by the addition of barium acetate, and mix well for about 5 minutes. I then dehydrate the reaction mixture by distillation under vacuum for approximately 20 minutes. In this manner I obtain a hard, brittle resin of good color.

Although in the above examples I proceed by gradually adding acrolein to the heated phenol, it will be obvious to those skilled in the art that essentially the same results may be obtained by reversing the procedure, that is, adding the phenol to the acrolein. I may also add the acrolein as a vapor to the phenol. Moreover, while I prefer to preheat the phenol for the production of brittle, fusible, potentially reactive resins, I may mix the phenol and the acrolein at ordinary room temperatures, subsequently increasing the temperature of the reaction mixture to a temperature above the boiling point of acrolein as the latter is consumed. In order to obtain a harder resin, I may continue the refluxing until a sample taken from the reaction mixture has become hard and brittle at room temperature. Conversely, in order to obtain a resinoid which is softer, I may reduce the refluxing time or I may carry out the reaction at lower temperatures, allowing the condensation in either case to proceed until the desired degree of hardness has been attained. Likewise, considerable variation may be effected in neutralizing the reaction mixture, the barium acetate of the above examples being substituted either by an alkaline reagent or by another salt of a weak acid.

*Example 5*

For the production of oil-soluble resins from phenol and acrolein, the phenol-acrolein ratio is maintained above 1:1.5 and preferably in the neighborhood of 1:2 or even 1:3. The catalyst which is preferably sulfuric acid is maintained within the limits stated above. Phenol is melted in the kettle and about ⅔ of the quantity of acid to be used in the condensation is added to the phenol. The remaining ⅓ of the acid catalyst is added to the acrolein which is then quickly poured into the phenol in the kettle. If the phenol is solid, the flask is warmed in order to melt the phenol, so that the mixture can be stirred. The mixture is then stirred and the temperature rises to the boiling point of acrolein. A cooling fluid may be applied to the kettle to moderate the reaction. After the heat of the reaction has been largely dissipated, external heat is applied to bring the temperature of the mass gradually to about 100° C. but below 105° C. At this point the acid catalyst may be neutralized by the addition of an equivalent amount of barium acetate or other alkaline material. The mass is then refluxed for a short period and then dehydrated, the temperature upon dehydration finally attaining a value of 120° C. This resin is soluble in drying oils such as China-wood and linseed oil and may be used for the preparation of coating compositions.

When the reaction is carried out at the lower range of temperatures the elements of water may be retained by the resin and therefore the yield calculated upon the assumption that complete condensation has occurred may be in excess of 100% and may extend up to as much as 120%.

As catalyst I may employ any of the acidic materials hereinbefore disclosed. The preferred catalyst is concentrated sulfuric acid, which acid probably forms a sulfonic acid of the phenol during the reaction, the catalyzing effect being exerted by the phenolsulfonic acid formed in situ. Other aromatic sulfonic acids may also be used.

This application is a continuation-in-part of my application Serial No. 463,069, filed October 23, 1942, now abandoned.

What I claim is:

1. The process for producing a resinous condensation product comprising heating together at a temperature between 52° C. and 105° C. a mixture consisting of phenol, acrolein and an aqueous solution of acid, said mixture containing between 0.75 to 1 mol of phenol for each 1 to 3 mols of acrolein, and said aqueous solution having an acid activity equivalent to that furnished by from 0.014% to 0.028% of $H_2SO_4$, based on the weight of phenol and acrolein in the mixture.

2. The process for producing a resinous condensation product soluble in drying oils, which comprises heating together at the refluxing temperature a mixture consisting of phenol, acrolein and sulfuric acid, said mixture containing 1 mol of phenol for each 1.5 to 3 mols of acrolein, and from 0.014% to 0.028% by weight, of sulfuric acid, and continuing said heating until said resin, when at room temperature is hard and brittle.

3. The process for producing a resinous condensation product comprising heating together at a temperature between 52° C. and 105° C. a mixture consisting of phenol, acrolein and sulfuric acid, said mixture containing 0.75 to 1 mol of phenol for each 1 to 1.5 mols of acrolein, and from 0.014% to 0.028% of $H_2SO_4$, based on the weight of phenol and acrolein in said mixture.

4. The process for producing a resinous condensation product which consists of passing the vapors of acrolein into a mixture consisting of molten phenol and sulfuric acid, said mixture containing between 0.023% to 0.047% by weight of sulfuric acid, whereby said acrolein is condensed with said phenol, continuing said passage of acrolein until between 1 and 3 mols of acrolein for each 0.75 to 1 mol of phenol has been condensed with said phenol, then neutralizing said sulfuric acid and dehydrating said resinous condensation product.

5. A potentially heat-reactive phenol-acrolein resin produced by the condensation, at a temperature between 52° C. and 105° C., of a mixture consisting of phenol, acrolein and an acid, said mixture containing between 0.75 to 1 mol of phenol for each 1 to 3 mols of acrolein and said acid having an acid activity equivalent to that furnished by from 0.014% to 0.028% of $H_2SO_4$, based on the weight of phenol and acrolein in the mixture.

6. A resinous condensation product soluble in drying oils produced by the condensation, at a temperature between 52° C. and 105° C., of a mixture consisting of phenol, acrolein and sulfuric acid, in the proportion of 1 mol of phenol for each 1.5 to 3 mols of acrolein and sulfuric acid in amount of from 0.014% to 0.028% based on the weight of phenol and acrolein in said mixture.

7. A resinous condensation product produced by the condensation, at a temperature between 52° C. and 105° C., of a mixture consisting of phenol, acrolein and an acid, said mixture containing between 0.75 and 1 mol of phenol for each 1 to 1.5 mols of acrolein, and said acid having an activity equivalent to that furnished by from 0.014% to 0.028% of $H_2SO_4$ based on the weight of phenol and acrolein in said mixture.

GRAFTON R. OWENS.

REFERENCES CITED

The following references are of record in the file of this patent:

UNITED STATES PATENTS

| Number | Name | Date |
|---|---|---|
| 2,265,688 | D'Alelio et al. | Dec. 9, 1941 |
| 2,282,928 | Bauer | Nov. 12, 1942 |

FOREIGN PATENTS

| Number | Country | Date |
|---|---|---|
| 23,775 | Germany | Nov. 23, 1883 |

OTHER REFERENCES

Maksorow et al.: Ind. Eng. Chem., July 1932, pages 827–33.